United States Patent [19]
Jardin et al.

[11] Patent Number: 5,405,184
[45] Date of Patent: Apr. 11, 1995

[54] VEHICLE ROOF WITH LIGHT TRANSMISSIVE COVER

[75] Inventors: Hans Jardin, Inning; Stefan Hauser, Munich; Werner Pätz, Diessen, all of Germany

[73] Assignee: Webasto-Schade GmbH, Oberpfaffenhofen, Germany

[21] Appl. No.: 128,099

[22] Filed: Sep. 29, 1993

[30] Foreign Application Priority Data

Sep. 29, 1992 [DE] Germany ............... 42 32 660.5

[51] Int. Cl.⁶ .............................................. B60J 7/00
[52] U.S. Cl. ................................. 296/215; 296/211; 49/38
[58] Field of Search .................... 296/211, 215, 96.19, 296/97.3, 97.7; 49/38, 62, 63, 64, 171

[56] References Cited

U.S. PATENT DOCUMENTS

| | | | |
|---|---|---|---|
| 1,996,426 | 4/1935 | Levan | 49/171 X |
| 2,078,002 | 4/1937 | Keil et al. | 49/171 X |
| 2,423,322 | 7/1947 | Hurley, Jr. | 296/96.19 X |
| 2,549,167 | 4/1951 | Brubaker | 49/38 X |
| 2,635,523 | 4/1953 | Hunter | 49/38 X |
| 4,505,069 | 3/1985 | Freeman | 49/64 |
| 4,671,564 | 6/1987 | Sumida et al. | 296/214 |

FOREIGN PATENT DOCUMENTS

| | | | |
|---|---|---|---|
| 1464014 | 12/1966 | France . | |
| 1574762 | 7/1969 | France . | |
| 3242097 | 5/1983 | Germany | 296/211 |
| 3817946 | 11/1989 | Germany . | |

Primary Examiner—Dennis H. Pedder
Attorney, Agent, or Firm—Sixbey, Friedman, Leedom & Ferguson; David S. Safran

[57] ABSTRACT

The invention relates to a vehicle roof having a light-transmissive cover, which has at least one outside panel, and having a device for varying the light-transmissibility of the cover. A light-transmissive cover of flat construction and easy actuation, whose light transmissibility can be steplessly regulated over a wide range, is achieved by integrating a device of darkening elements into a transparent cover, which is of extremely flat construction, is lightweight, mechanically easy to activate, and has a short regulating distance. Especially advantageous is a device whose darkening elements are formed by two superposed polarization films that are movable relative to each other. Such a configuration facilitates a particularly flat construction, and the light transmissibility of the cover is practically steplessly adjustable in a range of 0%–100%.

10 Claims, 5 Drawing Sheets

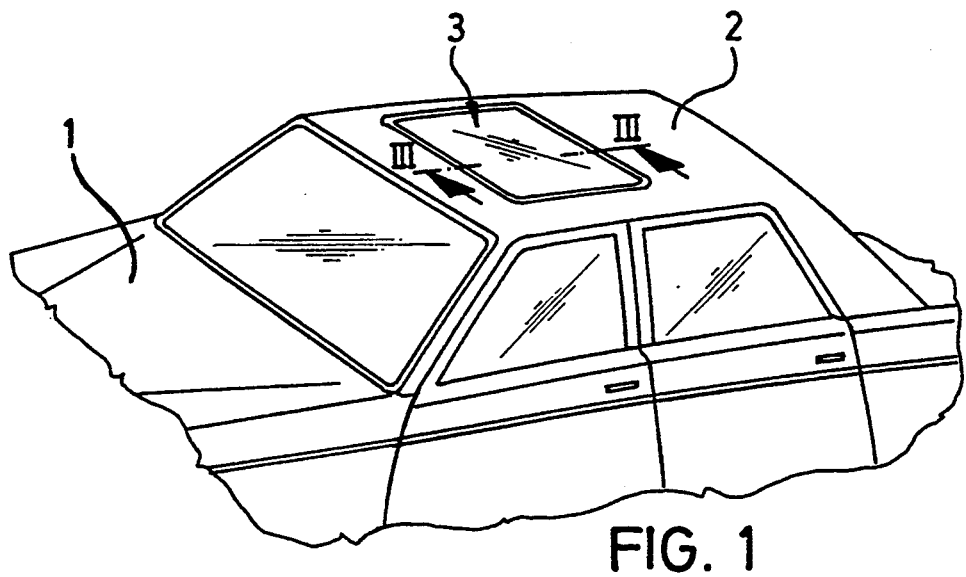
FIG. 1
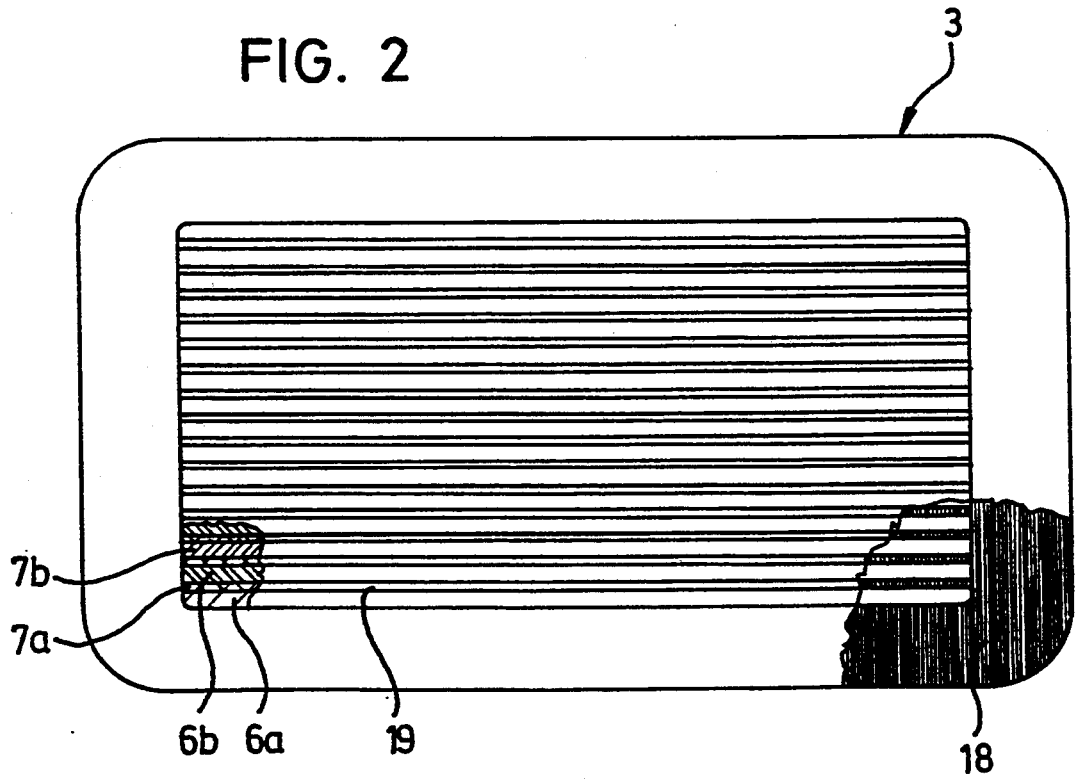

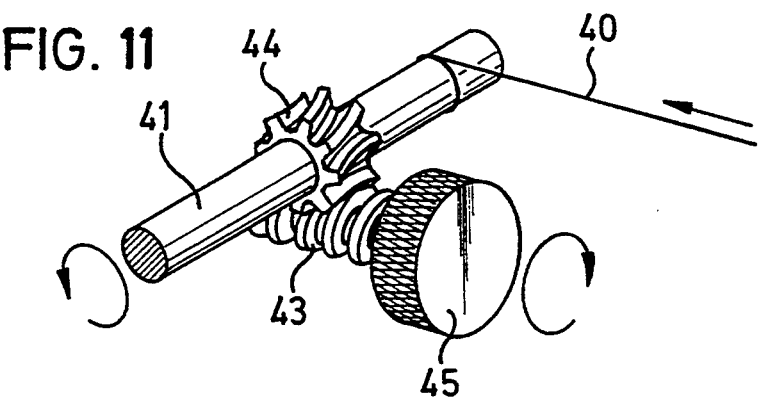
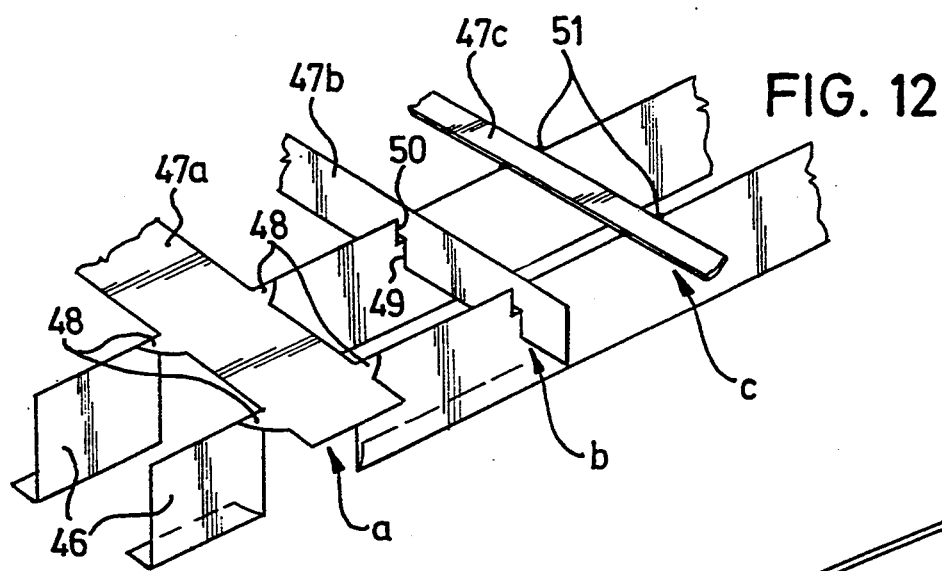
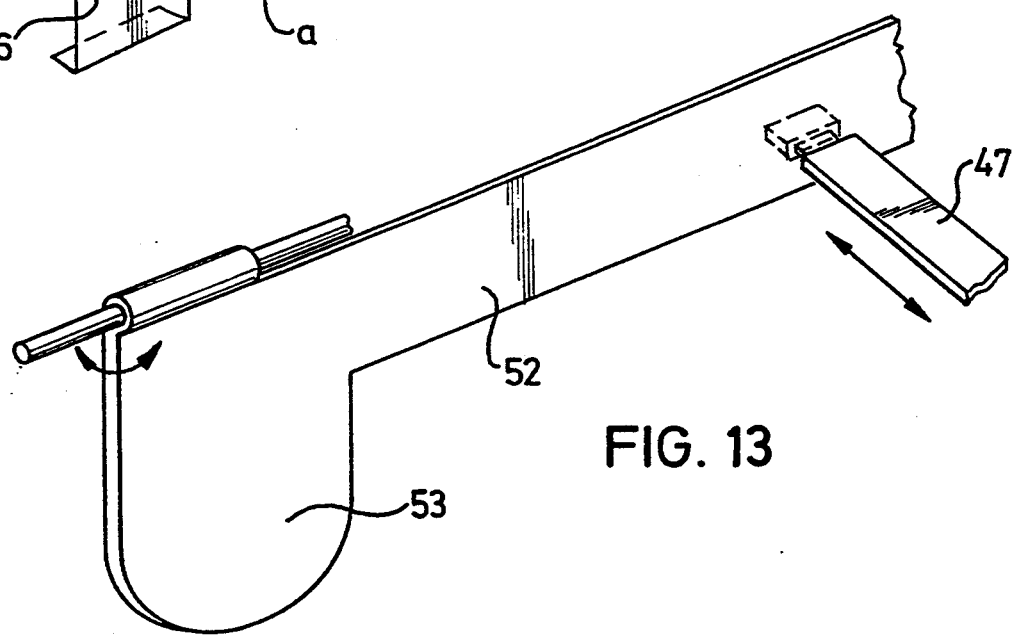

VEHICLE ROOF WITH LIGHT TRANSMISSIVE COVER

BACKGROUND OF THE INVENTION

The invention relates to a vehicle roof having a light transmissive cover formed of at least one outer panel, and a device for altering the light transmissibility of the cover.

When the following description refers to alteration of the light transmissibility, this means altering the amount of light that normally penetrates the panel, or the panels, of a light transmissive cover into the vehicle interior, based on the materials used therefor, inclusive of possibly applied coatings. This maximum, in connection with the percentage values given here, corresponds to a reference value of 100%.

It is known to interiorly provide transparent covers of sliding roofs and/or lifting roofs of vehicles with mechanically activated devices for the purpose of changing the light transmissibility. To this end, either extractable, spring-loaded shutters are employed for simple lifting roofs, or, in connection with sliding roofs, or sliding and lifting roofs, individually displaceable liner parts of non-transparent material are used beneath such roofs. These known devices have various drawbacks.

One common drawback is a relatively large construction height in comparison to the thickness of the transparent component, due to the necessary additional components required for guiding and housing such a device. An additional drawback of sliding liners, in connection with light-transmissive covers that are extended above the vehicle roof surface, is that, while they block off the incoming solar rays when closed, they, simultaneously, impair the ventilating effect of the extended cover.

Moreover, such liners and shutters have the drawback that darkening can only occur progressively in the movement direction, so that darkening in steps is only possible when it affects the entire surface of the light transmissive component; and it is not possible with respect to partial areas. Additionally, in connection with lifting roofs, so far, the only known shutters are those that are completely open or completely closed.

Furthermore, it is known to integrate devices into light-transmissive components for altering the light transmissibility, which, for this purpose, are acted upon by external energy. In this connection, mention should be made of multi-layered glass panels having an enclosed liquid crystal layer (Published German Application DE 38 17 946 A1) whose transparency can be changed depending upon an applied voltage. French Patent 1,574,762 describes two panels which are resiliently disposed with respect to each other, and depending upon the pressure of a fluid pressure source providing an intermediate liquid film of variable thickness, an inherently variable transparency is obtainable.

While the construction height of such integrated devices is low, they are not cost-effective in their construction and installation into a vehicle, due to the necessary coupling to the respective energy source.

SUMMARY OF THE INVENTION

Thus, the present invention has a primary objective to provide a light transmissive cover, having a device with low construction height and ease of operation, whose light transmissibility can be steplessly adjusted over a wide range.

This objective is achieved in accordance with preferred embodiments of the present invention by the use of darkening elements which are mounted beneath the outside panel of the cover and which are mechanically actuated to move a short, translatory or rotatory regulating distance.

By integrating extremely flat, light-weight, and mechanically simple darkening elements, which require only a small regulating movement to control the amount of light that can pass through or between them, into a transparent cover, the structure, particularly, of a sliding lifting roof is greatly simplified. The fact that such a darkening device automatically cooperates with all movements of the sliding cover permits elimination of not only the known sliding liner, but all means for guiding, driving or arresting such a liner can be eliminated as well. In addition to the advantages of an altogether lower height of construction and a lighter weight, an unimpeded ventilating effect is ensured in all open cover positions regardless of the degree of darkening selected. Based on the short regulating distance, the inventive device is significantly less subjected to wear than the devices used heretofore.

Advantageous embodiments of the invention are disclosed with a small space inbetween for receiving the darkening element, which is of particular advantage in connection with a cover comprised of two panels. Such a cover, in addition to increased rigidity and thermal insulating properties, has the advantage that the darkening elements are almost entirely protected against soiling and damage.

A device whose darkening elements are formed by superimposed polarization films that are moveable relative to each other is particularly advantageous. Such an arrangement results in an especially flat construction and the further benefit that the light transmissibility of the cover is practically, steplessly adjustable, in a range of 0%–100%.

Another advantageous embodiment provides that the darkening elements are formed by superimposed grating members that are moveable relative to each other, and which have an equally spaced arrangement of alternating light transmissive and non-transmissive areas. Such grating members, advantageously, are in the form of strips. They can, however, have other geometric forms, such as circle sectors, triangles or rectangles. Although the light transmissibility of such relatively movable grating members is adjustable only in a range of 0%–50%, they are a cost-effective alternative, based on their ease of manufacture.

In connection with the use of polarization films, or the use of grating elements, at least one of the darkening elements can be fixedly connected with one of the panels. This restricts the relative movement to a movement of one polarization film or one grating element, respectively. To this end, another embodiment provides that one polarization film, or one grating element each, are fixedly connected with the outside panel and with the inside panel, whereby the inner panel is movable relative to the outer panel. Such an arrangement has the advantage that the relatively thin films or grating elements, receive firm support from the glass panels.

Another advantageous variation of the invention is that the darkening elements are formed by a slotted, elastic film whose slots can be expanded by application of a tensile force, directed transversely to their length.

Such a film has the advantage of ease of manufacture, low construction height and simplicity of actuation.

Still another embodiment provides that the darkening elements are formed by laminated strips that are partially connected to each other. Such laminated strips always exhibit a precisely defined geometric form, regardless of the state of light transmissibility.

Furthermore, it is an advantage if the panels are arranged at a frame part of the cover, with this part also carrying the darkening elements and the means for actuation. As a rule, such frame parts, also designated as inner cover sheets, are already present in sliding roof covers. By an arrangement whereby the darkening elements and their actuating means are within the construction height of this frame part, an especially flat design is ensured.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 is a perspective view portion of a vehicle having a vehicle roof with a light transmissive cover;

FIG. 2 is a top view of a cover with strip-like polarization films as darkening elements;

FIG. 11 is an enlarged view of the encircled detail of FIG. 10;

FIG. 12 is a partial perspective view of a further embodiment in which tiltable laminates serve as the darkening element; and FIG. 13 shows a device for actuating the laminates shown in FIG. 12.

DETAILED DESCRIPTION OF THE PREFERRED EMBODIMENTS

In FIG. 1, a vehicle 1 is shown having a rigid vehicle roof 2, in which a light transmissive cover 3 is installed. Cover 3 may either be a rigidly installed panel, or it may be a cover which can be opened, such as, for instance, in the manner of a conventional lifting roof, sliding roof, or lifting and sliding roof.

Figure 3:
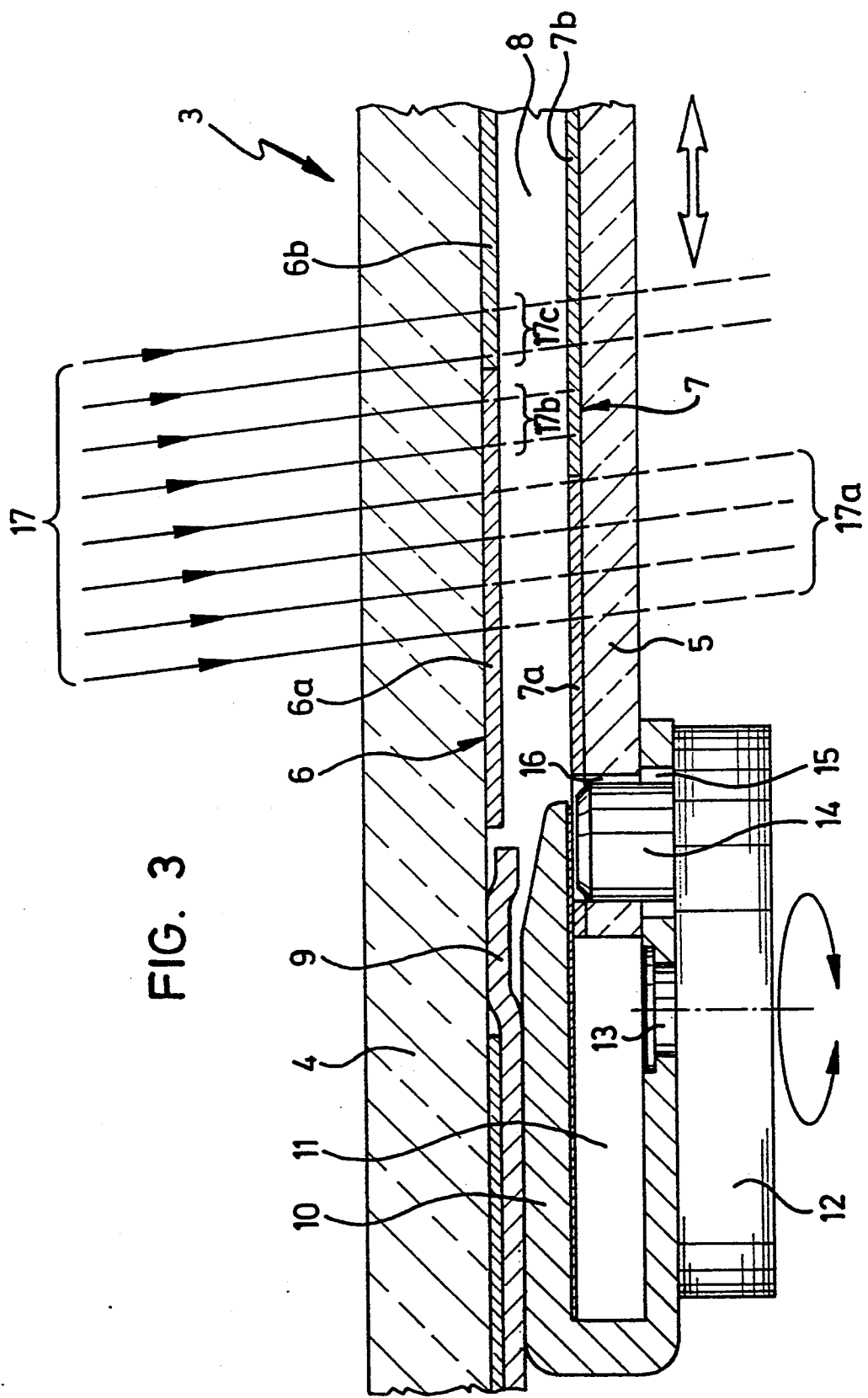
FIG. 3 is a longitudinal section through a portion of the cover of FIG. 2 in an area in which an actuating device is incorporated.

Cover 3, as shown in FIG. 3, is formed by an outside glass panel 4 and an inside glass panel 5, which have a space 8 disposed therebetween. At the inner side of outer glass panel 4, there is an upper polarization film 6 which, as is also shown in FIG. 2, is comprised of alternating strips 6a and 6b of opposite polarization directions. Opposite polarization direction, in all cases is meant to be a polarization direction turned by 90°. At the upper side of inner panel 5, there is a lower polarization film 7 comprised of strips 7a, 7b having opposite polarization directions. The polarization films 6, 7 may be attached to panels 4, 5 by adhesive, for instance.

The underside of the outer panel 4 is connected to an inner cover sheet 9, at the peripheral edge portion of panel 4, at which, where movable covers are concerned, the mechanics for actuation occur. A mounting element 10 is secured at the underside of the inner cover sheet 9, which has a fork-like cross-sectional configuration and converges inwardly to form a horizontal slot 11. The front edge of inner panel 5 is received in this slot of the fork-like mounting element 10, in a manner which enables panel 5 to be movable relative to the outside panel 4. Also, the inner panel 5, is displaceably supported at each lateral edge in similar fork-like mountings which extend parallel to the longitudinal direction of the vehicle. Alternatively, the fork-like mountings may be formed directly by an appropriate molding of the lower cover panel 5, as for instance, by a downwardly offset shoulder, disposed inwardly of the cover.

Movement of the lower cover panel 5 is effected by a control knob 12, which has a pivot pin 13 undetachably supported in the lower portion of fork-like mounting 10 in a manner permitting rotation thereof but precluding significant axial shifting. A connecting pin 14 is mounted at the top side of the control knob 12, eccentrically with respect to the rotational axis of knob 12 formed by pivot pin 13. The lower portion of fork-like mounting 10 facilitates has a semicircular slot-like opening 15 which enables a rotational movement of the knob 12 within mounting 10, with pin 14 extending through opening 15, by a predetermined amount. Since connecting pin 14, simultaneously, engages in a linear slot 16 in the inner panel 5, which extends transversely to the forward direction of vehicle 1, turning of control knob 12, and an inherent movement of pivot 14 around rotational axis 13, causes inner panel 5 to be forwardly displaced. This action changes the relative position of the upper polarization film 6 with respect to lower polarization film 7, so that strips 6a and 6b, assume a changed position, relative to strips 7a and 7b.

In the drawings, a hatching of identical gradient direction is used to indicate an identical polarization direction. Thus, in FIG. 3, strips 6a and 7a are shown having an identical polarization direction, with the result that the part of ray bundle 17 designated 17a, although slightly weakened, may pass through both polarization films 6 and 7 into the interior of the vehicle in an essentially unimpeded manner. On the other hand, the area in which strip 6a, in vertical projection, overlaps strip 7b, the rays 17b are absorbed. Conversely, in the overlapping area of strips 6b and 7b, because of the equidirectional polarization orientation of these two strips, there is transmissibility for rays 17c.

Since strips 6a and 6b, and opposite strips 7a and 7b, have the same width, a displacement of the inner panel 5 by one strip width relative to outside panel 4, permits a stepless adjustment towards total darkening or optimum transmission of rays 17. As can be seen from FIGS. 2 & 4, the peripheral areas 18, 18', in which inner cover sheet 9 is arranged, are opaque when viewed from the top side of the cover 3. The light transmissibility of the cover 3 is limited to the inner area in which mutually displaceable polarization films 6 and 7 are arranged. The overlapping areas of strips 6a and 7b, with opposite polarization directions, are designated with reference numeral 19, in FIG. 2.

Figure 4:
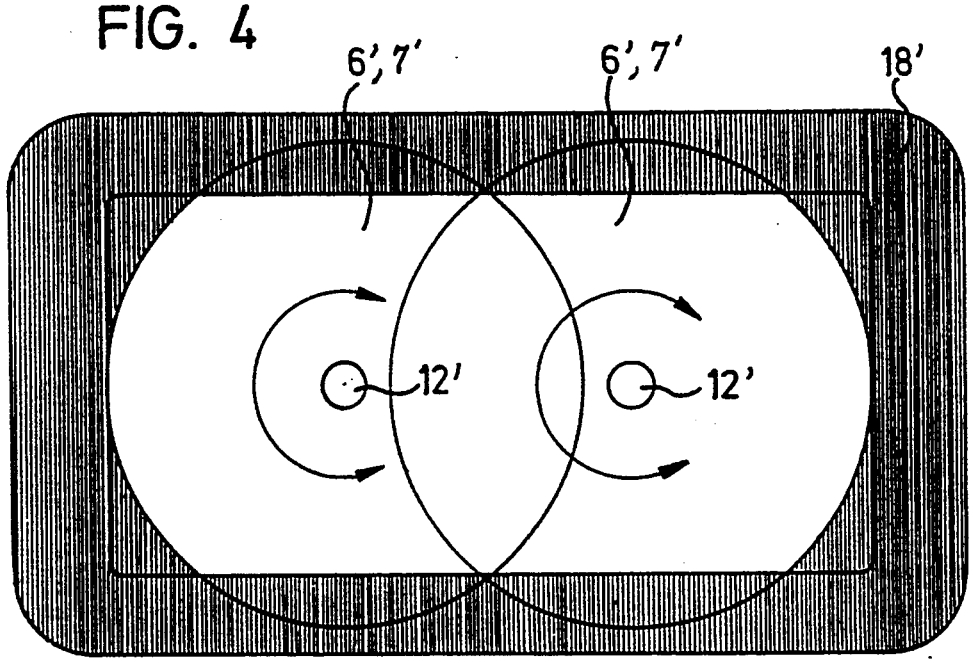
FIG. 4 shows a modified form of the FIG. 2 cover with rotatable polarization films.

FIG. 4 shows a variation of FIGS. 2 and 3, in which two pairs of circular film discs 6', 7' are provided adjacent each other. Each pair of disks comprises an upper polarization film 6 consists of two adjacent circular film disk element 6' which is fixed to the cover and which is hidden in the bottom view of FIG. 4 by the superposed lower film disc 7'. The pairs of film discs are partially overlapping, as shown, while the spaced apart upper and lower polarization film disk elements 6', 7' are oppositely polarized. Actuation for adjusting the light transmissibility, in this case, occurs by turning control knobs 12', whereby the circular film discs 6', 7' move in a relative motion with respect to each other. Displacement of the disc pairs by 90° enables the light transmissibility to be adjusted in a range of 0%–100%. The control knobs 12' can be synchronously actuated, either by a rack (not depicted) or by a toothed belt, so that a turning of one control knob induces a cooperative turning of the other one, or, alternatively, a separate adjustment of either control knob 12' is possible, facilitating a separate adjustment of light incidence on the driver's and the passenger's sides.

In both the FIG. 2 and FIG. 3 versions, involving rectangular strips of opposite polarization directions, and also in the FIG. 4 alternative, it is possible not to turn, or displace inside panel 5, opposite outside panel 4, but, instead, to only move lower polarization film 7 opposite upper polarization film 6. In this alternative embodiment, inside glass panel 5 can be completely dispensed with. It is, however, advantageous to have a configuration consisting of two panels encapsulating a darkening device, which is thus protected from the effects of dust and damage, which, in the above example, is formed by polarization films.

Figure 5:
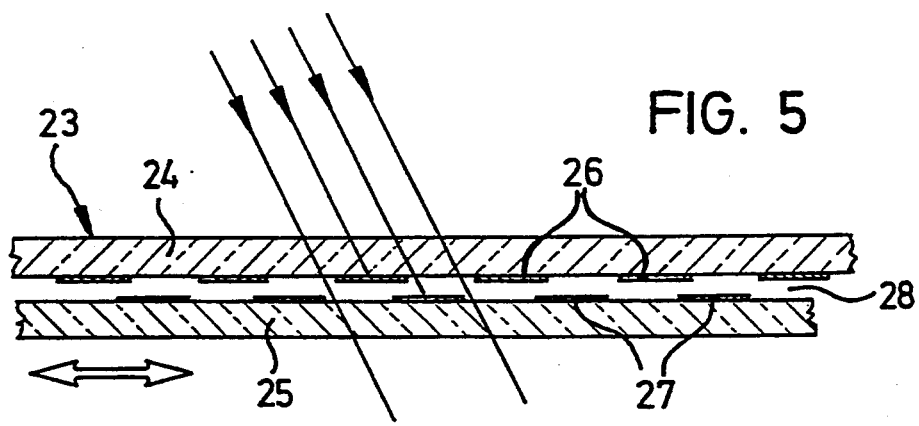
FIG. 5 is a cross-sectional view of an embodiment using mutually displaceable grating members.

FIG. 5 shows a light transmissive cover 23, which is comprised of an outer panel 24, and an inner panel 25 at a small distance therefrom which forms a space 28. At the inside of outer panel 24 there is strip-like grating member 26 comprising alternating light transmissive and light nontransmissive areas. At the upper side of inner panel 25, there is an identical strip-like grating member 27, which, also, consists of alternating light transmissive and light non-transmissive strips. Strip-like grating members 26, 27 may, for instance, be applied onto panels 24 and 25 by means of a screen print process. Inner panel 25, as is indicated by the block arrow, again analogous to the FIG. 3 example, is movable relative to the outer panel 24 in the longitudinal direction of the vehicle by an amount which is at least equal to the width of one strip of the grating members 26, 27. In this embodiment, a displacement of inside panel 25 facilitates an adjustment of light transmissibility ranging between 0%–50%.

Figure 6:
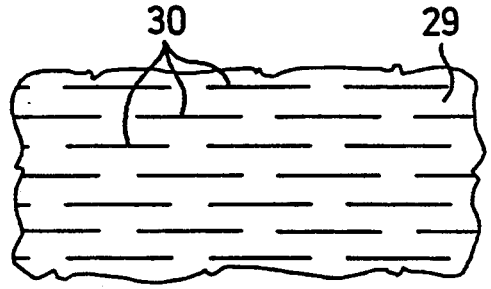
FIG. 6 is a plan view of a slotted film, for use as a darkening element, in a closed condition.
Figure 7:
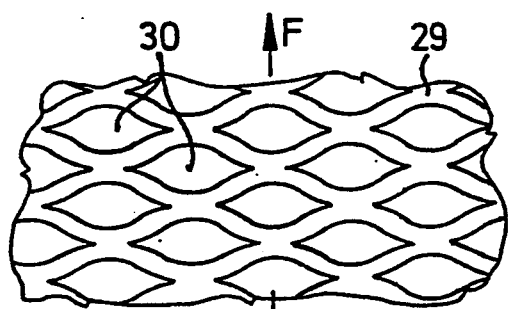
FIG. 7 shows the slotted film of FIG. 6 when opened.

In another variation, FIG. 6 features an elastic sheet 29 as a darkening element. Elastic sheet 29 has parallel rows of slits 30, arranged in an offset manner relative to each other. When the elastic sheet 29 is stretched transversely to the forward direction of the vehicle, (see FIG. 10) by the application of a tensile force designated F to the sheet 29, in a direction normal to the length of slits 30, i.e. in the vehicle forward direction, as shown in FIG. 7, yields an expansion of the slits such that the expanded slits 30' now have a substantially higher light transmissibility than the closed slits 30 in the starting position, illustrated in FIG. 6. The light transmissibility with such an elastic sheet 29 is adjustable within an approximate range of 5%–60%. A suitable arrangement for stretching of the sheet 29 is described below in connection with FIG. 10.

Figure 8:
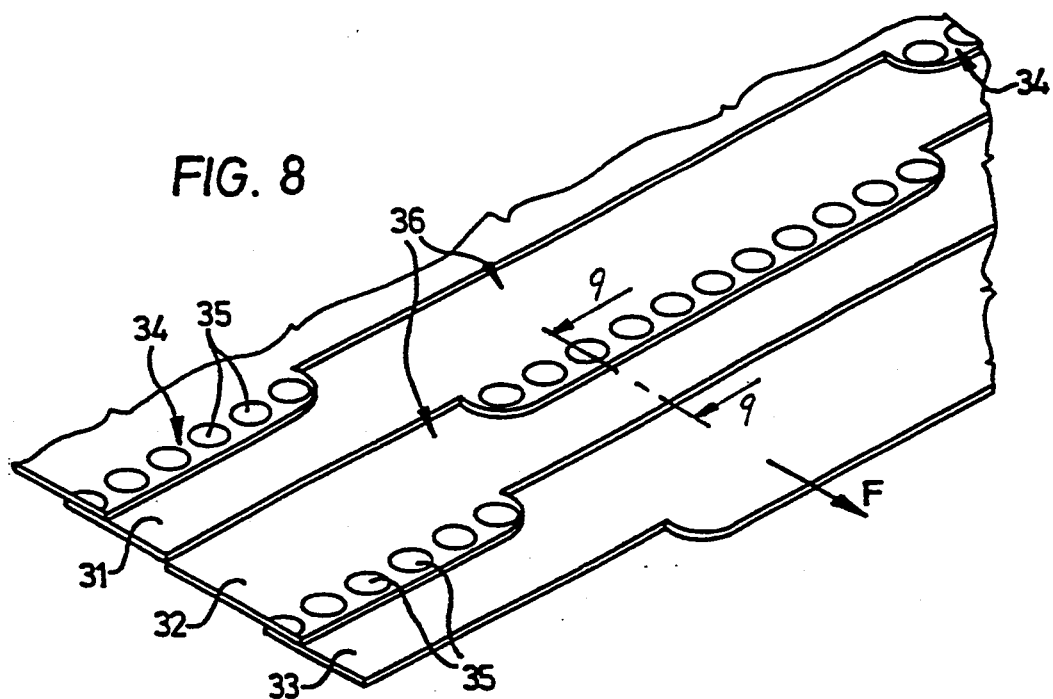
FIG. 8 is a perspective view of a darkening device consisting of overlapping stepped laminar strips.
Figure 9:
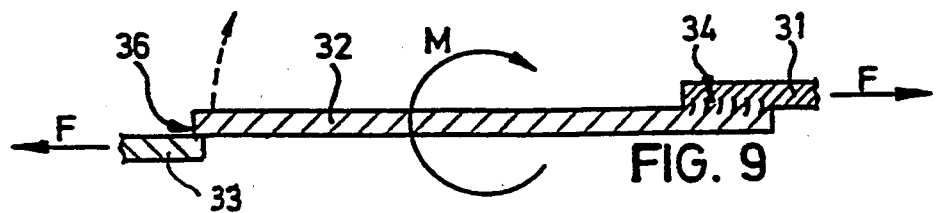
FIG. 9 is a schematic side view of the forces and moments occurring at the darkening device of FIG. 8.

An alternate to the previously described elastic film, in accordance with FIGS. 8 & 9, is a configuration of individual laminar strips 31, 32, 33, whereby, the strips are vertically offset relative to each other and are partially overlapping with each successive strip arranged slightly higher than the respective adjacent strip. For each pair of adjacent strips, overlapping connection areas 34 (for example, where the adjacent strips are interconnected by welding points 35) alternate in the longitudinal direction of the strips with unconnected areas 36. Furthermore, the connection areas 34 at one longitudinal edge of each strip are offset relative to the connection areas at the opposite longitudinal edge thereof, and the unconnected areas 36 are recessed relative to the connection areas.

As can be seen in FIG. 9, application of a tensile force F, in a direction transverse to the length of the strips, results in a torque M at the middle strip 32 (depicted there) due to the vertical offset, which leads to a lifting of the left edge of this strip 32 in unconnected area 36 (left, in the drawing). The elasticity of the strip material, and the spring force applied in the direction of the strips by the device shown in FIG. 10, causes strip 32, upon abatement of tensile force F, to again rest against strip 33. In this embodiment also, a light transmissibility can be steplessly adjusted in an approximate range of 0%–60%.

Figure 10:
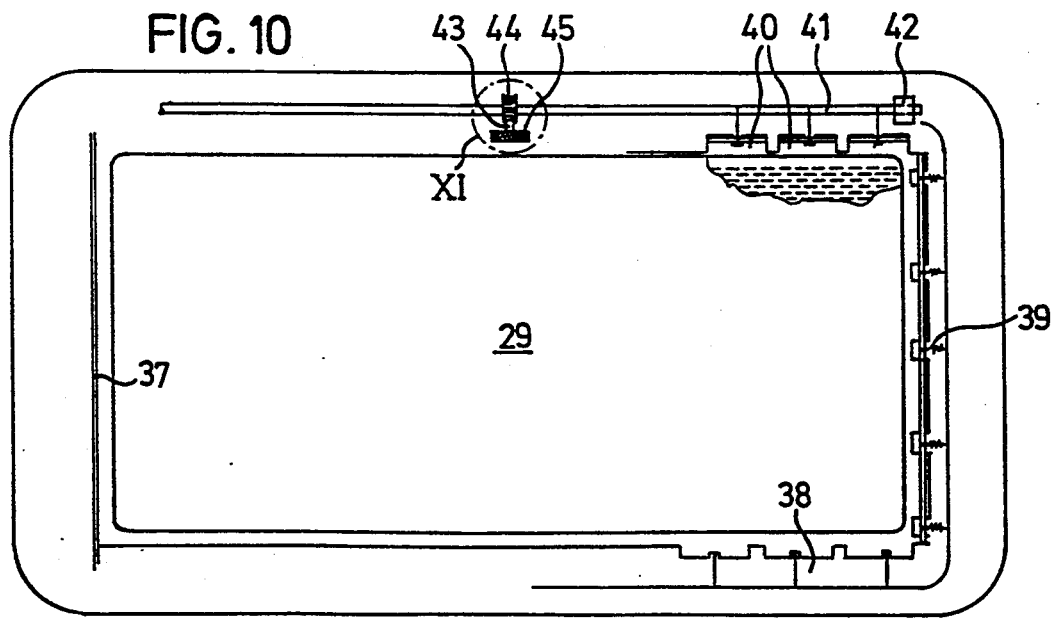
FIG. 10 is a view taken from the underside of a cover incorporating an appropriate actuating device for the darkening elements in accordance with FIG. 6–9.

An appropriate device for applying a tensile force F is depicted in FIG. 10. A slotted elastic sheet 29, according to FIG. 6, or alternatively thereto, a darkening device according to FIG. 8, consisting of several overlapping strips beneath an outer panel, in the area of the inner cover sheet is supported in a such a manner that one long side and one narrow side of the darkening device are rigidly fixed, in a direction normal to that side; however, the opposite side parallel thereto is provided with means to effect a change in length or width of the sheet. A rigid lateral connection is designated with numeral 37, and a rigid rear connection is designated with numeral 38. Opposite rigid lateral connection 37, a resilient lateral connection 39 of the darkening element at the cover is provided, whereby here again, individual areas are displaceably supported parallel to the lateral cover edge, thereby permitting a longitudinal expansion. In the area of the front cover edge, the darkening element is tied to a shaft 41 by means of several pulling means 40, which, in order to permit adjustment in width, are separated from each other by recesses. The end areas of shaft 41 are supported by means of two bearings 42, of which only one is depicted. Shaft 41, at its center, has a worm gear 44 that is connected so as to preclude relative rotation therebetween and which engages a worm gear 43 and which is manually adjustable by means of knurled knob 45. This device for rotating shaft 41 is depicted in an enlarged illustration in FIG. 11.

Turning of knurled knob 45, and with it worm gear 43, causes shaft 41 to be rotated by worm gear 44, thereby winding the wires which serve as pulling means 40. The restoring force is partially effected by the elasticity of sheet 29, or that of the strip material; however, more particularly, it is influenced by the action of tension springs arranged in the area of lateral cover edge 39, effective in the lengthwise direction of slits 30 (or strips 31, 32, 33, respectively), i.e. transversely to pulling elements 40. This worm drive provides the means for a sensitive adjustment of light transmissibility, and due to the self-locking characteristices of such a drive, arresting means for shaft 41 are not required.

A further alternative embodiment relating to a suitable darkening element is shown in FIGS. 12 and 13. The darkening element, here, is formed by several laminates 46, spaced apart at uniform intervals, and, preferably, arranged at the underside of the cover in a manner which allows them to be tillable transversely to the forward vehicle direction. These laminates 46 are movable from a vertical position, where the spaces between them ensure maximum light transmissibility, into an overlapped position, which permits a complete darkening, by use of the actuating bars that are hingedly connected at their upper or lower sides.

FIG. 12 shows with three letters, a, b, c, three different variations of suitable actuating bars, designated 47a, 47b, 47c. The actuating bar 47a is connected with laminate 46 by way of film hinges 48, which, advantageously, are made by a stamping of the same material. In a second form, the actuating bar 47b has a rectangular recess 49 at its underside, which engages recesses 50 at the upper side of laminate 46. In a third variation, the actuating bar 47c is connected to the laminate 46 via welding points 51.

The laminates, appropriately, are made of a synthetic material, which imparts an adequate, permanent elasticity to the connecting areas at film hinges 48 and welding points 51. FIG. 13 shows an actuating device which is equally suitable for all bars, without regard to which of the actuating bars 47a, 47b or 47c is used. The actuating bar, generally designated with numeral 47, is secured in the foremost tiltable laminate 52 by insertion into a receiving socket, and when the foremost laminate is tilted, by way of handle 53, disposed thereon, the bar parallelly transfers such tilting motion to all of the laminates 46. For the purpose of transferring the forces of actuation, both the foremost laminate 52, and the handle 53, are made of a sufficiently stiff (inflexible) material.

All inventive embodiments described above facilitate the provision of a darkening element which is mechanically easy to operate, is of flat construction, and can be mounted directly at the cover. It is to be understood, of course, that even combinations comprising several rigid, and/or movable, transparent covers on a single vehicle roof, are, advantageously, variable in their light transmissibility, when employing the above-described darkening devices.

Furthermore, in all of the embodiments, the regulatory distance through which the darkening elements must travel from a position of maximum darkening to one of minimum darkening is relatively short in comparison to that for prior art slidable liners which must travel the full length of the cover between maximally blocking and unblocking positions. That is, it being possible to use a regulatory distance that is as small as 1% of the length of the cover, e.g., especially for the embodiment of FIGS. 8 & 9, and never need be greater than 50% of the length of the cover, and in the case of the FIG. 4 embodiment, while a 90° rotation is required, that is a small distance when considering the size of knob 12' and the fact that only a mere quarter of a turn thereof is required.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Vehicle roof with a movable light transmissive cover, comprising an outside panel and a darkening device, associated with the cover, for varying the amount of incident light able to pass through the cover into an interior vehicle area; wherein the darkening device comprises darkening elements which are mounted beneath the outside panel of the cover and at least some of which are movable, and means for actuation of the darkening elements for moving the darkening elements which are movable from a position permitting maximum light transmissibility to a position maximally reducing light transmissibility by a regulating distance which is short in comparison to a corresponding length of the cover in a movement direction of the movable darkening elements; wherein the cover comprises an inside panel which forms a flat interspace in conjunction with the outside panel, said darkening elements being received in said interspace; and wherein the means for actuation of the darkening elements comprises a movable actuating part for moving the movable darkening elements in a lengthwise direction of the cover within said interspace and a fixed mounting element carrying said movable actuating part, the fixed mounting element being mounted on the underside of the cover in proximity to a peripheral edge area thereof and the movable actuating part having a rotary actuating element for operation of the movable actuating part by a user, said actuating element being positionally constant with respect to the lengthwise direction of the cover despite movement of the movable darkening elements by the movable actuating part.

2. Vehicle roof according to claim 1, wherein the darkening elements are formed by at least two superimposed polarization films which are moveable relative to each other.

3. Vehicle roof, according to claim 1, wherein the darkening elements are formed by superposed grating members having equally spaced, alternating light-transmissive and light non-transmissive areas, said grating members being moveable relative to each other.

4. Vehicle roof according to claim 1, wherein at least one of the darkening elements is fixedly connected with one of the inside and outside panels.

5. Vehicle roof according to claim 4, wherein the inside panel is movable relative to the outside panel.

6. Vehicle roof according to claim 5, wherein the darkening elements are formed by at least two superimposed polarization films which are moveable relative to each other.

7. Vehicle roof, according to claim 5, wherein the darkening elements are formed by superposed grating members having equally spaced, alternating light-transmissive and light non-transmissive areas, said grating members being moveable relative to each other.

8. Vehicle roof according to claim 1, wherein the darkening elements are formed by an elastic sheet having slits therein, said slits being expandable by the application of a tensile force to the elastic sheet in a direction transverse to a direction of extension of the slits.

9. Vehicle roof according to claims 1, wherein the darkening elements are formed by partially interconnected strips.

10. Vehicle roof according to claim 1, wherein said regulatory distance is less than 50% of the length of the cover in the movement direction of the darkening elements.

* * * * *